United States Patent [19]

Ramlow

[11] 4,440,028

[45] Apr. 3, 1984

[54] PROTECTIVE SHIELD FOR FLOW METER SIGHT GLASS

[75] Inventor: Ralph W. Ramlow, East Troy, Wis.

[73] Assignee: Waukee Engineering Company Inc., Milwaukee, Wis.

[21] Appl. No.: 353,180

[22] Filed: Mar. 1, 1982

[51] Int. Cl.³ .............................................. G01F 1/22
[52] U.S. Cl. .................................... 73/861.55; 73/325
[58] Field of Search ........... 73/861.57, 861.55, 272 R, 73/325, 326, 861.56

[56] References Cited

U.S. PATENT DOCUMENTS

| | | | |
|---|---|---|---|
| 362,445 | 5/1887 | Hodges | 73/325 |
| 635,565 | 10/1899 | Mears | 73/326 |
| 1,325,514 | 12/1919 | Hanau | 73/861.55 |
| 2,388,672 | 11/1945 | Brewer | 73/861.55 |
| 3,212,334 | 10/1965 | Conlon | 73/326 |
| 4,317,375 | 3/1982 | Egert | 73/861.55 |

Primary Examiner—Gerald Goldberg
Assistant Examiner—Brian R. Tumm
Attorney, Agent, or Firm—Andrus, Sceales, Starke & Sawall

[57] ABSTRACT

A protective shield for the sight glass of a flow meter. The flow meter includes an elongated guard having a slot that houses a sight glass, and a flow indicator carried by a float moves vertically within the sight glass and the fluid flow is read on a scale mounted on the guard and bordering the slot. A transparent open-ended protective sleeve is disposed around the guard and is retained on the guard by a spring clip that extends inwardly of the sleeve and engages an abutment on the outer surface of the guard.

7 Claims, 4 Drawing Figures

PROTECTIVE SHIELD FOR FLOW METER SIGHT GLASS

BACKGROUND OF THE INVENTION

Float-type flow meters are frequently used to measure the flow of air, industrial gases or other fluids. In flow meters of this type, a float is mounted for movement within a tapered passage in the body of the meter and the float will rise in proportion to the rate of gas flow. The float carries a rod which extends downwardly into an elongated guard that houses a sight glass. An indicator mounted on the lower end of the rod moves within sight glass in accordance with movement of the float and indicates the rate of gas flow on a calibrated scale that is mounted on the guard adjacent the sight glass.

If the flow meter is subjected to extreme high or sudden surge pressure conditions, as could occur in the event of a malfunction of the pressure regulator or by the normal sudden opening of a solenoid valve in the fluid line, the high or sudden pressure could fracture the sight glass. Therefore, it is desirable to provide a protective shield around the sight glass to prevent glass fragments from dispersing into the surrounding atmosphere in the event of fracture.

In addition, the scale and sight glass on an industrial-type flow meter may become contaminated with dirt, oil and other foreign material making it difficult to read the rate of flow, and in certain instances it is difficult to adequately remove the contamination from the sight glass and scale.

SUMMARY OF THE INVENTION

The invention is directed to a protective shield for a sight glass of a float-type flow meter. The flow meter includes an enlongated guard which extends downwardly from the body of the flow meter and has a slot or recess that houses a sight glass. An indicator carried by the float rod moves within the sight glass and the flow is read on a scale which is mounted on the guard bordering the slot.

Disposed around the guard is a transparent open-ended shield or sleeve, and the shield is retained on the guard by a spring clip that extends chord-wise across the interior of the sleeve. The spring clip is adapted to engage an abutment on the outer surface of the guard to prevent longitudinal displacement of the shield from the guard.

To install the shield, the shield is inserted onto the guard with the spring clip disposed gernerally parallel to the flat scale. The shield is then rotated, causing the spring clip to be deformed outwardly until the spring clip reaches the region of the abutment on the guard, and the spring clip will then snap inwardly into engagement with the abutment to lock the shield in position on the guard.

The sleeve or shield, being formed of impact resistant plastic, will protect the sight glass from external impact and will prevent glass fragments from being dispersed into the atmosphere in the event the sight glass should fracture due to internal pressure.

In addition, the shield will prevent the sight glass and graduated scale from becoming contaminated by oil, grease, dirt or other foreign material, and if the shield itself becomes contaminated it can be readily wiped clean to restore its original condition. The shield can be readily installed with either new flow meters or it can be retrofitted to existing flow meters in the field. No auxiliary parts or fasteners are required to install the shield, and it can be quickly installed by merely inserting around the guard and rotating it until the spring clip engages the abutment.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
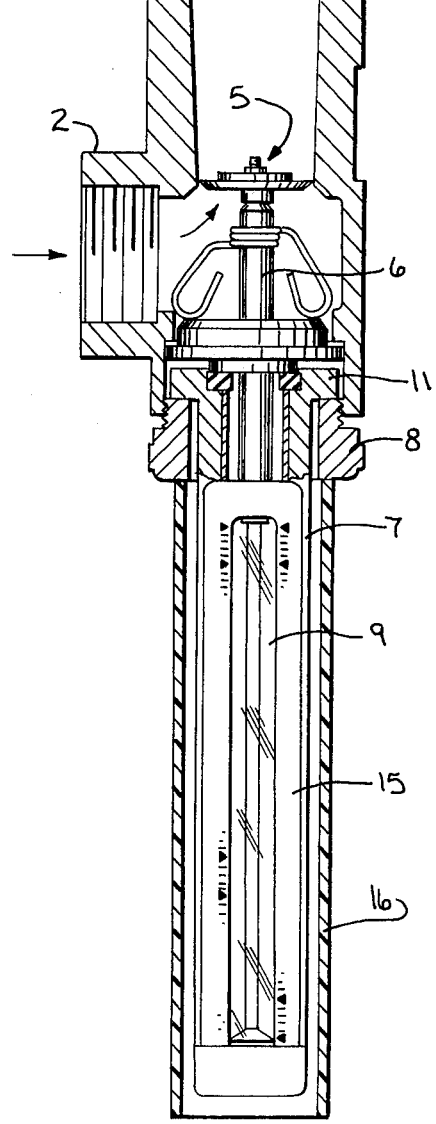
FIG. 1 is a longitudinal section of a conventional flow meter incorporating the protective shield of the invention.

FIG. 1 illustrates a typical float-type flow meter incorporating the protective shield of the invention. The flow meter includes a body 1 having an inlet 2 into which a fluid, such as air, industrial gas or oil, is introduced and an outlet 3 for the discharge of fluid. A tapered passage 4 connects the inlet and outlet, as shown in FIG. 1.

Float assembly 5 is mounted for vertical movement within tapered passage 4, and the float assembly will rise and fall within the tapered passage in proportion to the rate of flow of gas in a conventional manner.

A stem or rod 6 is connected to float assembly 5 and extends downwardly through the lower open end of the body into an elongated guard 7 which is connected to the lower end of the body through threaded nut 8.

Figure 2:
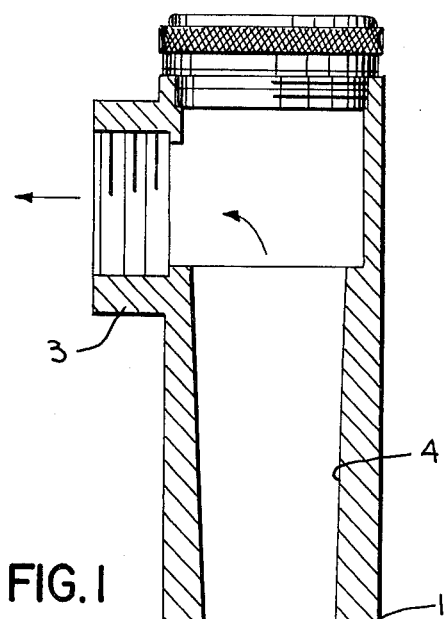
FIG. 2 is a transverse section of FIG. 1.

A tubular sight glass 9 is mounted within guard 7 and an indicator 10, carried by the lower end of stem 6, moves within the sight glass in accordance with movement of the float assembly within the tapered passage 4. Guard 7, as shown in FIGS. 1 and 2, includes an upper flanged end 11 which is clamped against the body by nut 8 and a pair of elongated slots 12 and 13 are formed in opposite sides of the guard and extend substantially the full length of the guard. As shown in FIG. 2, the surfaces of guard 7 bordering the slot 12 are flattened and a conventional graduated scale 15 is mounted on flattened surfaces 14. Scale 15 is provided with a central opening aligned with slot 12 so that sight glass 9 and indicator 10 is visible through slot 12.

In accordance with the invention, a transparent plastic sleeve shield 16 formed of an impact resistant plastic material, such as polycarbonate or the like, is disposed around guard 7. To connect shield 16 to guard 7, a spring clip 17 is secured within a pair of circumferentially spaced openings 18 in the lower portion of the shield. As best shown in FIG. 2, spring clip 17 extends chord-wise across the interior of shield 16 and is engaged with a ledge or abutment 19 at the lower end of slot 13 on guard 7. Engagement of the spring clip 17 with the abutment 19 prevents shield 16 from being withdrawn from guard 7.

Figure 3:
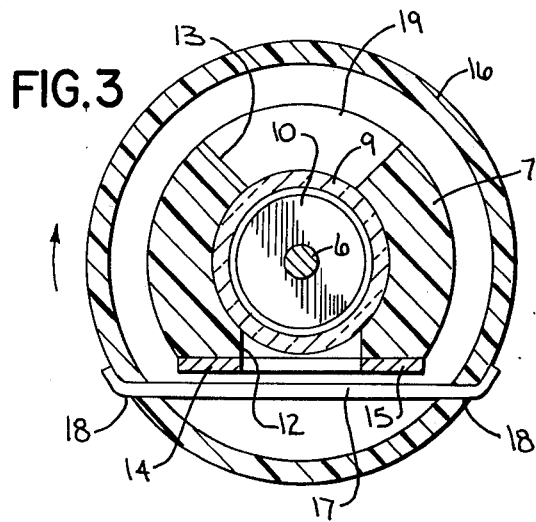
FIG. 3 is a view similar to FIG. 2 showing the shield as it is initially installed on the guard.
Figure 4:
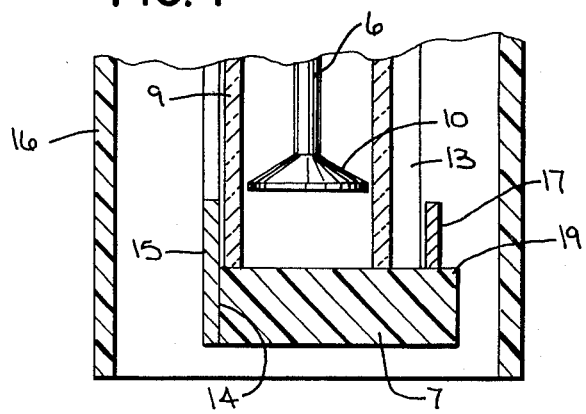
FIG. 4 is a section taken along line 4—4 of FIG. 2.

To install shield 16, the shield is inserted around guard 7 in the manner shown in FIG. 3, in which the spring clip 17 is parallel to scale 15. With the upper end of shield 16 in engagement with nut 8, the shield is then rotated 180° causing spring clip 17 to be deformed outwardly as it is rotated. Due to its resilient nature spring clip 17 will snap back to its original position in the region of the slot 13 above abutment 19, to preventing the shield from being withdrawn from the guard.

The protective shield of the invention is an inexpensive and simple device which can be readily installed and removed from the guard. As the spring clip 17 is permanently fixed to the shield there are no auxiliary parts or fasteners that are required to be used when installing the shield.

As the shield is transparent, indicator 10 and scale 15 are visible through the shield, and the shield will not only protect the surrounding area from glass fragments in the event the sight glass should fracture due to excessive internal pressure, but also protects the sight glass and scale from external impact and contamination.

Various modes of carrying out the invention are contemplated as being within the scope of the following claims particularly pointing out and distinctly claiming the subject matter which is regarded as the invention.

I claim:

1. A flow meter, comprising a body having a fluid inlet and fluid outlet and having a passage connecting said inlet and outlet, a float assembly disposed within said passage and adapted to move within the passage in accordance with the rate of flow of fluid therethrough, a guard connected to the body and having an elongated recess, a transparent sight glass disposed within the recess, a rod connected to the float assembly and extending within the sight glass, an indicator connected to the rod, a scale mounted adjacent said recess, movement of the indicator within the sight glass indicating the rate of flow on the scale, a tubular shield disposed around the guard and having a transparent portion disposed in alignment with said sight glass and said scale, an abutment on said guard, and spring clip means mounted on the shield and engaged with the abutment to prevent longitudinal movement of the shield with respect to said guard, an outer surface of the guard being generally flat and said abutment being spaced circumferentially from said surface, said shield being installed on said guard with said spring clip means being disposed generally parallel to said surface, rotation of said shield causing said spring clip means to deform outwardly and to seat against said abutment.

2. The flow meter of claim 1, wherein said spring clip means extends chord-wise across the interior of said shield.

3. The flow meter of claim 1, wherein said shield is provided with a pair of circumferentially spaced openings, and the ends of said spring clip means are secured within said openings.

4. A flow meter, comprising a body having a fluid inlet and a fluid outlet and having a passage connecting said inlet and outlet, a float assembly disposed within said passage and adapted to move within the passage in accordance with the rate of flow of fluid therethrough, a guard connected to the body and having an elongated recess, a transparent sight glass disposed within the recess, a rod connected to the float assembly and extending within the sight glass, an indicator connected to the rod, a scale disposed adjacent said recess, movement of the indicator within the sight glass indicating the rate of flow on the scale, a transparent impact resistant plastic sleeve disposed around the guard, a flexible connecting member disposed within said sleeve, said connecting member having a locking position and being capable of being deformed outwardly from said locking position, and abutment means on the outer surface of said guard and disposed to be engaged by said connecting member when said connecting member is in said locking position said connecting member having a pair of opposite ends, said ends being connected to said sleeve at circumferentially spaced locations and said connecting member extending chord-wise between said locations, said guard having a generally flat surface spaced circumferentially from said abutment means, said sleeve being initially inserted around the guard with said connecting member disposed generally parallel to said flat surface, said sleeve being rotated causing said connecting member to deflect outwardly and said connecting member being biased to its locking position as the connecting member is rotated to the region of said abutment means to thereby effect engagement of said abutment means by said connecting member.

5. A flow meter, comprising a body having a fluid inlet and a fluid outlet and having a passage connecting said inlet and outlet, a float assembly disposed within said passage and adapted to move within the passage in accordance with the rate of flow of fluid therethrough, a guard connected to the body and having an elongated recess, a transparent sight glass disposed within the recess, a rod connected to the float assembly and extending within the sight glass, an indicator connected to the rod, a scale mounted adjacent said recess, movement of the indicator within the sight glass indicating the rate of flow on the scale, a tubular shield disposed around the guard and having a transparent portion disposed in alignment with said sight glass and said scale, spring clip means including a central section extending generally chord-wise across the interior of said shield, said guard having a longitudinally extending recess disposed to receive said central section of said clip means as said shield is inserted around said guard, and a laterally extending abutment on said guard and spaced circumferentially from said recess, rotation of said shield relative to said guard causing said central section to deform outwardly and to seat against said abutment to prevent outward longitudinal displacement of said shield relative to said guard.

6. The flow meter of claim 5, wherein in the ends of said clip means are disposed within openings in said shield.

7. The flow meter of claim 5, wherein said recess comprises a generally flat longitudially extending surface on said guard, said central section of said clip means being disposed generally parallel to said surface as said shield is inserted on said guard.

* * * * *